Figure 1:
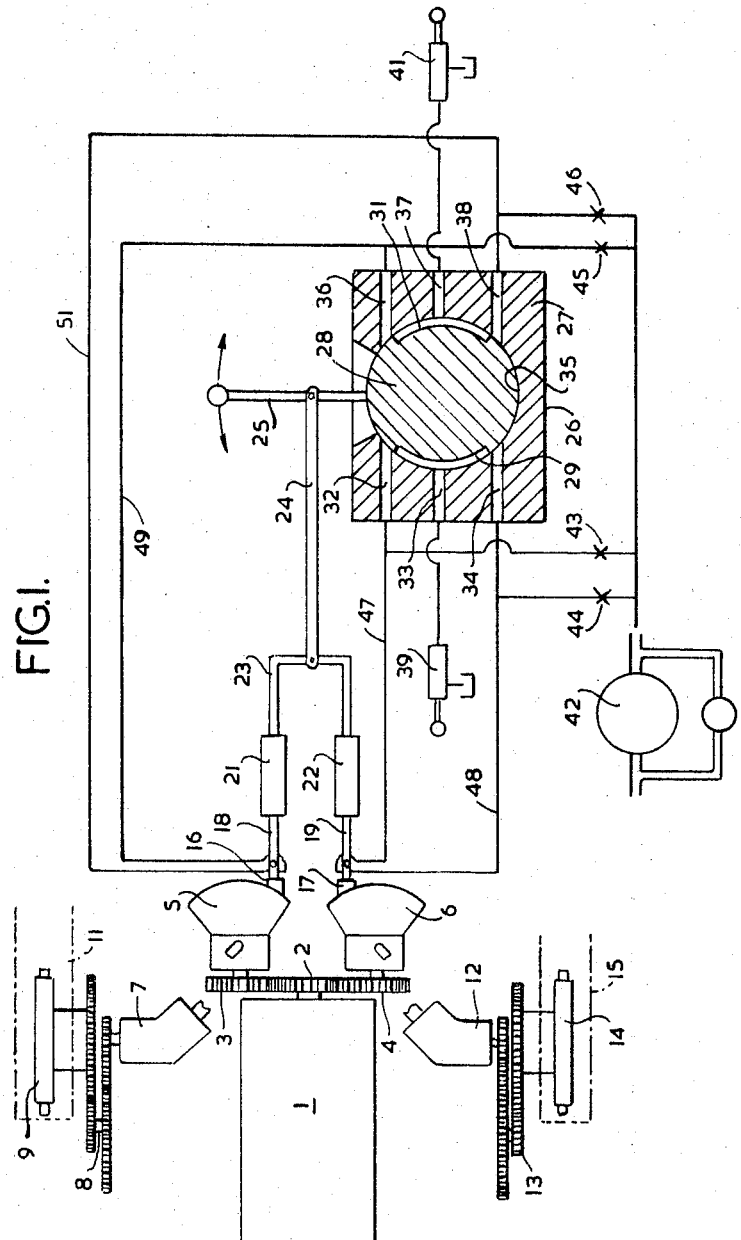

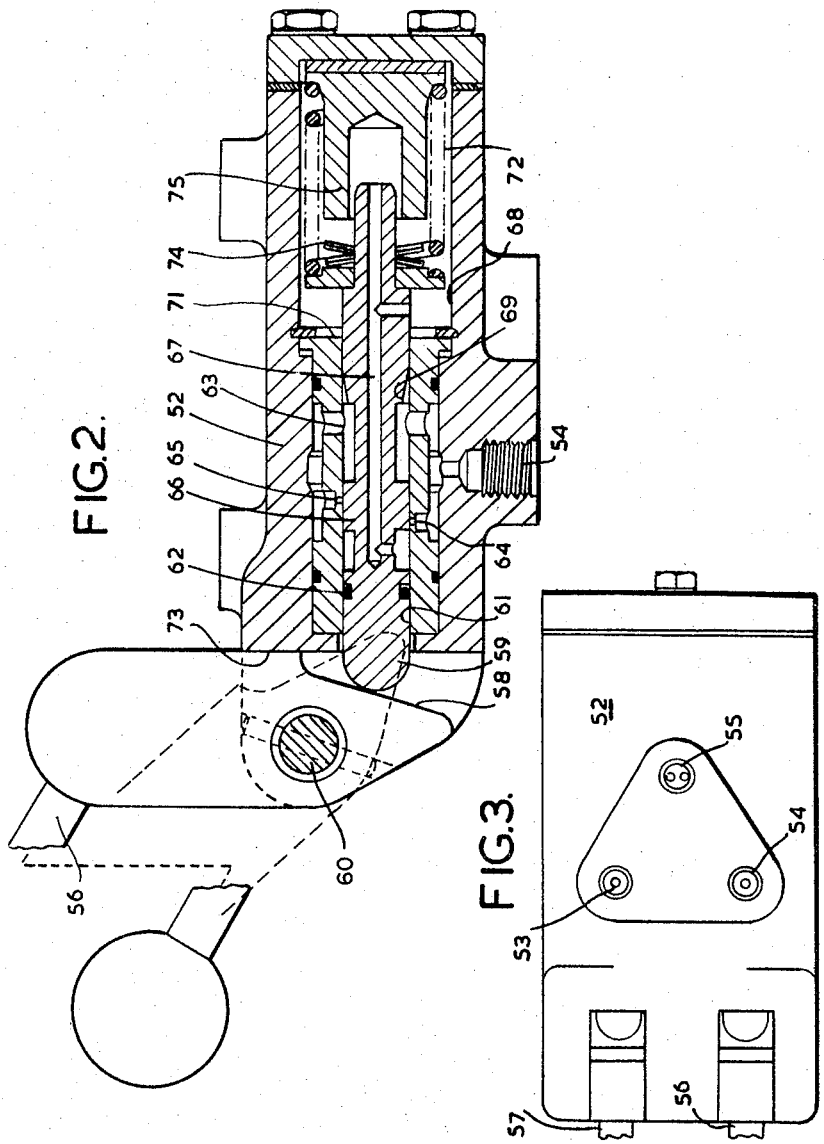

Feb. 28, 1967 B. C. KEMPSON 3,306,385
VEHICLE DRIVE AND STEERING SYSTEM
Original Filed Aug. 15, 1961 4 Sheets-Sheet 4

INVENTOR
BERTRAM C. KEMPSON
BY Reynolds & Christensen
ATTORNEYS

United States Patent Office 3,306,385
Patented Feb. 28, 1967

3,306,385
VEHICLE DRIVE AND STEERING SYSTEM
Bertram Carl Kempson, St. Marks, Cheltenham, England, assignor to Dowty Hydraulic Units Limited, Ashchurch, Tewkesbury, England, a British company
Continuation of abandoned application Ser. No. 131,522, Aug. 15, 1961. This application Aug. 28, 1964, Ser. No. 394,378
Claims priority, application Great Britain, Aug. 19, 1960, 28,812/60
5 Claims. (Cl. 180—6.48)

This application is a continuation of my earlier filed application Serial No. 131,522 of the same title and filed on August 15, 1961, now abandoned.

This invention relates to control apparatus for dual infinitely variable speed ratio power transmissions installed in a vehicle to transmit power from a single engine or other power source to ground engaging elements spaced transversely of the vehicle to obtain vehicle speed control and steering. The object of the invention is to provide a simplified form of such a control. For the purpose of this specification the term speed ratio as applied to a power transmission refers to the ratio of output speed to input speed of the transmission. In this invention this will mean for each transmission the ratio between the speed of the ground engaging element driven by the transmission and the power source speed.

In a vehicle having dual infinitely variable power transmissions to transmit power from the vehicle engine or other power source to ground engaging elements spaced transversely of the vehicle the present invention comprises a speed control means operable to adjust both transmissions similarly so that they have the same speed ratio for the control of vehicle speed, and a pair of steering controls operable one on each transmission to reduce in an overriding sense the selected speed ratio for that transmission without reducing the speed ratio of the other transmission. Thus reduction of the speed ratio of one or other transmission will determine a curved path of travel for the vehicle. The steering controls may be arranged so that speed ratio reduction of a transmission is proportional to movement of the steering control. A single manually operable steering member may be mechanically arranged relatively to the two steering controls to operate one or the other alternatively and such a steering member may take the form of the conventional steering wheel. The steering controls may be arranged so that the reduction in speed ratio of their associated transmissions is proportional to movement over a part only of the steering control movement, further movement being arranged to give large reduction in speed ratio of the associated transmission to enable very acute curves to be negotiated by the vehicle. The vehicle to which the invention relates may be a vehicle having twin endless tracks such for example as a crawler tractor or alternatively it may be a wheeled vehicle intended for travelling over rough or yielding ground. The invention is intended more particularly to employ hydraulic infinitely variable power transmissions whose speed ratio is basically determined by a hydraulic servo motor and which may be reduced in an overriding sense for steering purposes by a simple variable leak valve.

Figure 4:
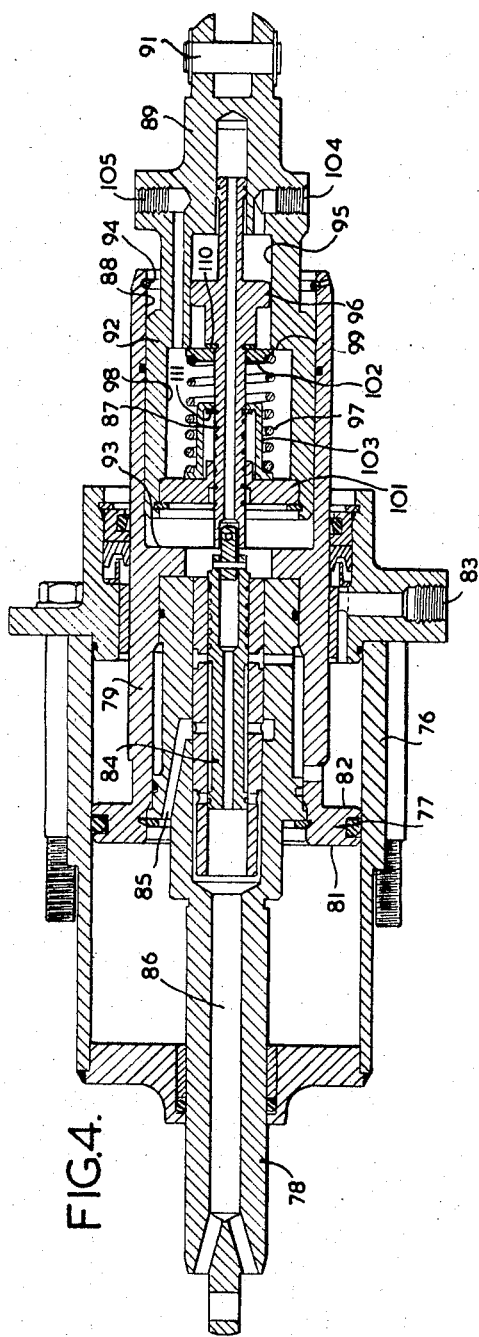
Figure 5:
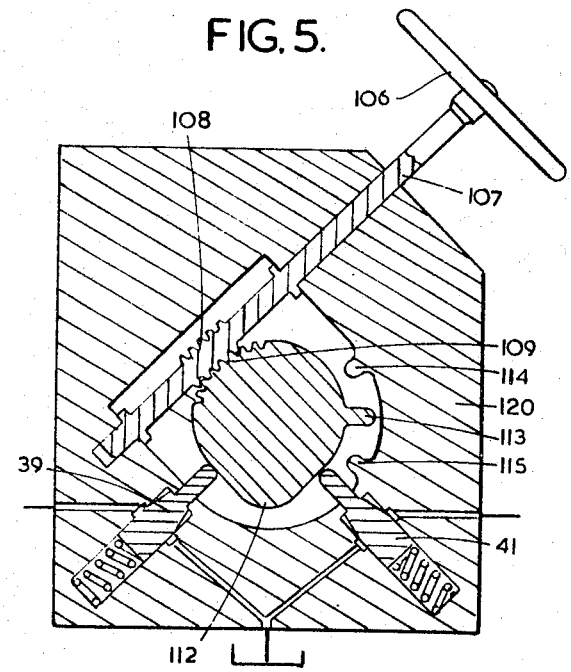

One example of the invention employing dual hydraulic infinitely variable speed ratio transmissions for driving the tracks of a crawler tractor will now be described together with one modification thereof with reference to the accompanying drawings in which, FIGURE 1 is a circuit diagram of the control system of the invention, FIGURES 2 and 3 are cross-section and plan respectively of a steering control, FIGURE 4 is a cross-section through a servo motor for adjustment of a transmission speed ratio, and FIGURE 5 is a modified version showing a simple single control member for alternative operation of the two steering controls.

Reference is made initially to FIGURE 1 of the drawings. In these drawings the tractor engine 1 is connected to drive a main gear wheel 2 with which meshes a pair of gears 3 and 4 individually connected to drive a pair of infinitely variable positive displacement hydraulic pumps 5 and 6. These pumps may have any known constructional form. The pump 5 is hydraulically connected with a fixed displacement hydraulic motor 7 which drives through a gear train 8 a sprocket 9 in driving engagement with one endless track 11 of the tractor. Similarly the pump 6 is hydraulically connected to drive a fixed displacement hydraulic motor 12 which drives through a gear train 13 a sprocket 14 in driving engagement with the other track 15 of the tractor. Thus pump 5 and motor 7 form one transmission whilst pump 6 and motor 12 form the other transmission. For displacement adjustment each pump 5 and 6 includes respectively a servo motor 16 or 17 the structure of each of which is shown in detail in FIGURE 4 and will be described later in this specification. Each servo motor includes a projecting control member respectively 18 and 19, and movement applied to this control member to the left or to the right from the central position as seen in the drawings will cause a forward or reverse displacement respectively to be effected on the associated pump. The controls 18 and 19 are movable together by means of a pair of caged spring units 21 and 22 from a yoke 23. A link 24 pivotally connected to the yoke 23 extends to a speed control lever 25. For ordinary speed control of the tractor it is merely necessary to move the lever 25 to the left or to the right as seen in the drawings to cause corresponding movements of the servo motor controls 18 and 19 which will give forward or reverse displacement to the pumps 5 and 6 and thus driving speeds in the forward or reverse sense to the tracks 11 and 15. The displacement of each pump is directly proportional to the speed ratio of the transmission of which it forms part and that displacement adjustment effects speed ratio adjustment.

Apart from adjusting the pump displacements the lever 25 also rotates a control valve 26 which comprises a body 27 having a rotary plug 28 therein. The rotary plug includes two opposed recesses 29 and 31. The recess 29 co-operates with three ports 32, 33 and 34 extending into the bore 35 in which the plug is located. Similarly the recess 31 co-operates with three ports 36, 37 and 38 also extending into the bore 35. In the zero speed position as indicated in FIGURE 1 recess 29 is in communication only with port 33 and recess 31 is in communication only with port 37. Movement of lever 35 in the forward sense i.e. to the left as seen in the drawing causes recess 29 to connect port 33 to port 34 and recess 31 to connect port 36 to port 37. Movement of lever 25 in the reverse sense i.e. to the right as seen in the drawing will cause recess 29 to connect port 33 to port 32 and recess 31 to connect port 37 to port 38. The port 33 is externally connected to steering control 39 whilst port 37 is externally connected to steering control 41. Each of these steering controls comprises an adjustable leak valve whose structure will be described more particularly with reference to FIGURE 2.

The ports 32, 34, 36 and 38 are fed from an auxiliary pump 42 through respectively the restrictors 43, 44, 45 and 46. The ports 32 and 34 are also connected through pipes 47 and 48 to the servo motor 17 for overriding control thereof. Similarly the ports 36 and 38 are also connected through pipes 49 and 51 to servo motor 16 for overriding control thereof.

For operation of the control system as described in FIGURE 1 it will be seen that if forward speed of the tractor is selected by lever 25 by movement to the left from a central position port 33 is connected to port 34 and port 36 is connected to port 37. This means that operation of the leak valve 39 permits flow of liquid from pump 42 through restrictor 44 and thus reduces pressure at pipe 48 relatively to the pipe 47. Similarly if valve 41 is operated flow of liquid takes place through restrictor 45 which will reduce pressure in pipe 49 relatively to pipe 51. In this way the valve 39 can apply an overriding control to servo motor 17 in one particular direction only which is arranged to be reduction of the selected forward displacement of pump 16. Similarly if valve 41 is operated the pressure difference between pipes 49 and 51 is such as to cause reduction in the selected forward displacement of pump 5. When reverse speed of the tractor is selected by lever 25 to the right from the central position the valve plug 28 will connect ports 33 and 32 together by the recess 29 and ports 37 and 38 together by the recess 31. Operation of leak valve 39 now causes liquid flow through restrictor 43 to reduce pressure in pipe 47 relatively to pipe 48, similarly operation of leak valve 41 will now cause reduction of pressure in pipe 51 relatively to pipe 49. Thus it will be seen that the function of valve 26 is to reverse the operative action of the leak valves 39 and 41 depending on whether forward or reverse speed is selected forward or reverse by lever 25 so that operation of either of these leak valves can only act to reduce the selected displacement given to either of the pumps 5 and 6 by movement of the lever 25.

In control of the tractor incorporating the control arrangement of FIGURE 1 the driver will select tractor speed by operation of the lever 25. If he wishes to steer in one direction or the other he will operate either the leak valves 39 or 41 and the vehicle will then move along a curved path determined by the actual reduction in selected displacement given to one or other of the pumps 5 or 6. This, of course, means that one or the other tracks 11 or 15 will move at a lower speed than the other track. The arrangement of the valves 39 and 41 on the vehicle is such that they are located on the side of the vehicle adjacent to the track which they effectively control so that if the vehicle is to be turned to the right the driver depresses the leak valve 41 on the right of the vehicle. This will, of course, apply both for forward and reverse movement of the vehicle.

Reference is now made to FIGURES 2 and 3 of the accompanynig drawings which illustrate the leak valves 39 and 41 in more detail. The valves are enclosed in one body 52 having connectors 53 and 54 for connection to the ports 33 and 37 of the valve 26. A return connection 55 is connected to the hydraulic reservoir. From this valve body a pair of levers 56 and 57 project for operation of the respective leak valves 39 and 41. FIGURE 2 shows a cross section through one of these leak valves as controlled by the lever 56. The lever 56 is pivoted at pivot pin 60 and has a cam surface 58 for co-operation with a projecting plunger 59 from the valve body 52. The plunger is slidably carried in a cylinder 61 and at the outer end a seal 62 is provided to prevent escape of pressure liquid. The connection 54 has access to cylinder 61 at a pair of main ports 63 and at a pair of orifices 64 and 65. The orifices 64 and 65 are controlled by a land 66 on the plunger 59 for successive opening. These orifices when open permit flow of liquid through an axial passage 67 in the plunger for escape into a chamber 68 in connection with the reservoir connection 55. The plunger 59 also includes a tapered portion 69 which co-operates with the inner end 71 of the bore 61 so that with inward movement of the plunger 59 a leakage path in between port 63 and the space 68 is opened up and increased. The end of the plunger 59 within the chamber 68 acts on a compression spring 72 which opposes inward motion of the plunger 59 and normally acts to urge the plunger against the cam surface 58 of the lever 56 so that an abutment 73 of the lever rests against the body 52 of the valve. A further spring 74 composed of Belleville washers co-operates with an abutment 75 within the chamber 68 so that at almost the complete movement of the plunger 59 the Belleville washers engage the abutment 75 and further movement is possible only by exerting a heavy force on the lever 56.

Reference is now made to the servo motor illustrated in FIGURE 4. Such a servo motor is provided for each of the pumps 5 and 6. This servo motor is disclosed in United States Patent 3,017,750 but a slight modification has been made which will be referred to further in this specification. This servo motor comprises a servo cylinder 76 within which a servo piston 77 is slidably mounted. A small diameter piston rod 78 extends through one end of the cylinder 76 through a seal and is connected for displacement adjustment of the transmission pump with which it co-operates. In the position shown i.e. at midstroke, the transmission pump is held at zero displacement, movement to the left in the drawing giving forward displacement to the pump and movement to the right giving reverse displacement to the pump. Through the opposite end of the cylinder 76 a plunger 79 extends from piston 77, plunger 79 being of considerably larger cross-section than piston rod 78. This permits of the left hand working surface 81 of the piston 77 to be much larger in effective area than the right hand working surface 82. A fluid pressure connection 83 carries pressure liquid into the servo motor and this is connected directly to the right hand end of cylinder 76 for operation on area 82 of piston 77. The source of this servo liquid may conveniently be pump 42 illustrated in FIGURE 1. Within the plunger 79 a control valve 84 is located which by longitudinal movement can operate to connect pressure from the right hand end of cylinder 76 to the left hand thereof through a passage 85 or alternatively it may connect the left hand end of the cylinder 76 to reservoir pressure by connecting the passage 85 to a central passage 86 within piston rod 78 which opens into the casing of the associated transmission pump for return to reservoir. The valve 84 is moved for controlling piston 77 by means of a rod 87 extending into a bore 88 within the right hand end of plunger 79. The main control member 89 of the servo motor is slidably mounted within the bore 88 and projects from the right hand end thereof, a pin 91 being provided for connection either to the control rods 18 or 19 of FIGURE 1. The portion 92 of the control member 89 which is slidably mounted within the bore 88 is capable of sliding a limited amount between the inner end 93 of bore 88 and an outer stop 94 on bore 88. The main difference between the present construction and that disclosed in our said prior application concerns the amount of lost motion provided for the control member. In the present construction this lost motion is considerably greater than in the said prior application. Within the control member 89 a small diameter cylinder 95 is formed within which a piston 96 is slidably mounted. The rod 87 is integrally formed with piston 96. A caged spring 97 is provided within a chamber 98 in control member 89 which is loaded between fixed stops 99 and 101 through the medium of loose stops 102 and 103 carried by the rod 87. The loose stops are engaged between fixed stops 110 and 111 on the rod 87 by the action of the spring 97. The function of the spring 97 is to ensure that a pdedetermined pressure difference must exist on either side of piston 96 before movement of the piston 96 can occur. A connector 104 extends from the right hand end of cylinder 95 whilst a connector 105 extends from the left hand end of cylinder 95. For the transmission pump 6 the connection 105 of the servo motor is connected to pipe 47 and connection 104 is connected to pipe 48. For the transmission pump 5 the connector 105 is connected to pipe 51 and the connection 104 is connected to pipe 49.

Adjustment of a transmission pump displacement is effected through the control member 89 and normally movement thereof is transmitted directly to the rod 87 through the caged spring 97 if there is no pressure difference between connections 104 and 105. Such movement will adjust valve 84 to cause servo piston 77 to follow automatically and to adjust pump displacement correspondingly. In the event that a selected displacement is to be reduced by operation of a leak valve 39 or 41 a pressure difference will occur between the connections 104 and 105. Assume that forward displacement is selected and then that the leak valve 39 is opened. The forward displacement selection will have moved the control 89 and servo piston 77 to the left of the position in FIGURE 4. Opening of the leak valve 39 will cause reduction in pressure at the port 34 and pipe 48 which reduces pressure at connection 104. This will cause piston 96 to move to the right when the loading of spring 97 is overcome. Such movement to the right will move valve 84 and cause servo piston 77 to move to reduce selected forward pump displacement. Such movement is, however, normally not transmitted to the control member 89 because of the permitted lost motion of the sliding portion 92 in the cylinder 88. The amount of reduction of pressure at connection 104 will determine the amount of movement of piston 96 against the spring 97 and thus the amount of reduction of selected pump displacement. Referring to the leak valve illustrated particularly in FIGURE 2 it will be seen that initial movement of the lever 56 will cause orifice 64 to be opened. This orifice is calibrated in conjunction with the restrictor 43 or 44 so that the drop in pressure obtained for small movement of the lever 56 is sufficient to overcome the loading of spring 97 in the servo motor. A further movement of the lever 56 will cause slow escape of liquid to be permitted by virtue of the increasing opening between the taper 69 and the sharp edge 71 of bore 61. This will result in a further graduated reduction in pressure with movement of lever 56 which will permit movement of the piston 96 in conjunction with movement of lever 56. Thus the amount of depression of lever 56 will determine reduction of related displacement of the associated transmission pump and thus the curved path of movement of the tractor. If reverse displacement is selected by movement of lever 24 to the right from the FIGURE 1 position and it is desired to turn to the same side of the vehicle the leak valve 39 is operated by movement of the lever 56 and reduced pressure is then supplied as a result to the connection 105 of the servo motor of pump 6. Selection of reverse movement will have caused displacement of servo piston 77 to the right from the FIGURE 4 position and reduction of pressure at connection 105 will cause the auxiliary piston 96 to move to the left to reduce the selected displacement. Similarly the other leak valve 41 is operated by lever 57 in the event that it is desired to turn towards the side of the vehicle having track 11 whether forward or reverse movement is selected. For a considerable steering movement of the tractor during manoeuvering it may be necessary for one track to be moved in the opposite direction to the other track so that in effect the tractor may move angularly on one spot without substantial forward or reverse movement. This effect is obtained by selecting a small forward or reverse speed by lever 25 and then depressing the lever 56 or 57 a considerable amount to the extent that the Belleville washers 74 contact their abutment 75 and the taper 69 will open a flow passage between connection 54 and space 68. The resulting large reduction in pressure at connection 104 now causes compression of spring 97 to the extent that follow up movement of piston 77 to reduce pump displacement causes the shoulder 93 which forms part of the plunger 79 to contact the sliding portion 92 of the control member 89. This will result in effectively locking together the control member 89 and the plunger 79 so that movement of the servo piston 77 cannot now cancel control movement given to the valve 84. The servo piston 77 will now tend to move toward the right hand limit of its movement in cylinder 76 as seen in FIGURE 4. The driver of the tractor would normally depress lever 56 to obtain such movement for a very short period in order to obtain a substantial speed reduction and even reversal of the track controlled by lever 56 or 57. Such full depression of lever 56 or 57 would not immediately result in a large change of displacement of the associated pump because of the fact that the auxiliary pump 42 for supplying servo liquid to the servo motor connector 83 is capable only of a limited supply of pressure liquid.

FIGURE 5 illustrates a modification of the invention disclosed in FIGURES 1 to 4. In FIGURE 5 a single steering control in the form of a steering wheel 106 is provided mounted on a rotary shaft 107. The shaft includes a worm 108 meshing with a worm wheel sector 109. This sector is pivotally mounted in a casing 120 by means not shown and at a position spaced from the gear teeth includes a cam shaped lobe 112. This lobe co-operates with the two leak valves 39 and 41 shown in FIGURE 1 which are located at angularly spaced positions on either side of the lobe 112. A lug 113 also carried by the gear segment 109 co-operates with two abutments 114 and 115 which limit angular movement of the sector 109. The valves 39 and 41 are angularly spaced about the axis of the sector 109 by an amount equal to the angular extent of the lobe 112. As shown in FIGURE 5 the sector 109 is so set that neither leak valve 39 or 41 is operated to ensure that the tractor will travel along a straight path. Movement of the steering wheel 106 in either direction will cause operation of one or other of the valves 39 or 41 to reduce the speed of one or other of the tracks and so cause the tractor to travel along a curved path. The arrangement as shown in FIGURE 5 has the particular advantage that it prevents simultaneous operation of both valves 39 and 41.

I claim as my invention:

1. In combination, a vehicle having two ground-engaging elements spaced transversely thereof, a power source for driving the vehicle, a pair of infinitely variable speed ratio hydraulic power transmissions interconnecting the ground-engaging elements with the power source, a pair of movable secondary speed controls connected to the transmissions to vary the speed ratios thereof, a primary speed control connected to the secondary speed controls to select a common speed ratio for the transmissions, and a pair of steering controls connected to the secondary speed controls to effect overriding adjustments in the speed ratios of the transmissions, there being overrider means in the connections between the secondary speed controls and the primary speed control permitting the secondary speed controls to move individually in relationship to the primary speed control, said primary speed control having movable intermediate controls connected therewith, and said secondary speed controls including pairs of movable servo and follower controls, the former of which are connected with the intermediate controls by the overrider means and individually responsive to the operation of the steering controls to move in relation to the intermediate controls, and the latter of which are connected with the transmissions and individually responsive to the operation of the servo controls to follow the movements thereof, there being connections between the intermediate controls and the follower controls limiting the movements of the follower controls in relation to the intermediate controls to less than the movements permitted the servo controls in relation to such intermediate controls by the overrider means, so that the follower controls interlock with the intermediate controls after small overriding adjustments in the speed ratios of the transmissions, and additional overrider means in the connections between the intermediate controls and the primary speed control permitting the intermediate controls to move individually in relation to the primary speed control, so that the follower controls and the intermediate controls can move together for larger overriding adjustments in the speed ratios of the transmissions.

2. The combination according to claim 1 wherein the transmissions include a pair of hydraulic pumps which have infinitely variable deliveries that determine the speed ratios of the transmissions, and wherein the follower controls are connected with the pumps to vary the deliveries thereof.

3. The combination according to claim 1 wherein the follower controls are hydraulically operated and the servo controls include a pair of control valves in the hydraulic systems of the follower controls.

4. The combination according to claim 1 wherein the servo controls are hydraulically operated and the steering controls include a pair of leak valves in the hydraulic systems of the servo controls.

5. The combination according to claim 4 further comprising a direction valve which is conjointly operable with the primary speed control and disposed in the hydraulic systems of the servo controls, intermediate the leak valves and the servo controls, to interconnect the leak valves with their corresponding servo controls such that the direction of speed ratio adjustment effected by the steering controls is opposed to that effected by the primary speed control.

References Cited by the Examiner
UNITED STATES PATENTS

| | | | |
|---|---|---|---|
| 2,941,609 | 6/1960 | Bowers et al. | 180—6.48 |
| 3,024,858 | 3/1962 | Davis et al. | 180—6.48 |
| 3,025,673 | 3/1962 | Brown et al. | 180—6.48 X |

BENJAMIN HERSH, *Primary Examiner.*

J. A. PEKAR, *Assistant Examiner.*